United States Patent [19]

Richardson

[11] 4,296,286
[45] Oct. 20, 1981

[54] SELF-REFERENCING POSITION SWITCH

[75] Inventor: Warren N. Richardson, Mashpee, Mass.

[73] Assignee: TRW Inc., Cleveland, Ohio

[21] Appl. No.: 95,042

[22] Filed: Nov. 16, 1979

[51] Int. Cl.³ .............................................. H01H 9/00
[52] U.S. Cl. ............................. 200/61.54; 200/61.88; 200/61.27
[58] Field of Search ................ 200/16 C, 16 D, 61.27, 200/61.3, 61.34, 61.35, 61.54, 61.88, 303

[56] References Cited

U.S. PATENT DOCUMENTS

3,431,374  3/1969  Raab ........................... 200/61.88 X
3,461,256  8/1969  Ferryman, Jr. ................. 200/61.88

*Primary Examiner*—James R. Scott
*Attorney, Agent, or Firm*—James R. O'Connor; Martin J. O'Donnell; Thomas C. O'Konski

[57] ABSTRACT

A self-referencing position switch particularly adapted to respond to the position of an automobile gear shift lever. The switch is responsive to the position of a movable external member relative to a stationary member and includes a pair of housing sections one of which is attached to the stationary member and the other of which defines a track for a movable switch member which follows the movements of the external member and is arranged to close the switch at a selected location along the track. The two housing sections are movable relative to one another in more or less the direction of the track so that by engaging the movable switch member against one or the other end of the track and moving the housing sections relative to one another, the selected location on the track can be correlated with a selection position of the movable member.

19 Claims, 8 Drawing Figures

SELF-REFERENCING POSITION SWITCH

This invention relates to electrical switches. It relates more particularly to a self-referencing position switch.

BACKGROUND OF THE INVENTION

A position switch is one that is responsive to the position of a movable member relative to a fixed or reference member. The switch closes when the movable member is located at a selected position or positions relative to the fixed member. For example, a position switch may be incorporated into the steering column of an automobile or other vehicle to sense the position of a column-mounted shift lever and to activate an external device such as a back-up light when and only when the shift lever is moved to a particular position in the steering column, e.g. the REVERSE position. Accordingly, we will describe the invention in this context. It should be understood, however, that the invention has equal utility in many other applications.

In many vehicles, the steering column comprises a central shaft which connects the steering wheel to the mechanism that turns the vehicle's front wheels. Mounted coaxially with that shaft is a rotative tube which links the column-mounted gear shift lever to the vehicle's transmission. The shift lever is movable to any one of several positions to select a particular gear arrangement in the transmission. For example, the typical shift lever for an automatic transmission includes the positions of PARK, REVERSE, NEUTRAL, DRIVE, SECOND and LOW.

Surrounding the shift lever tube is a stationary outer sleeve which extends from the steering wheel through the dash into the automobile's engine compartment. This outer sleeve serves as a protective housing and a support for various other parts of the steering column, including for example, indicia referencing the aforementioned positions of the gear shift lever.

In the usual arrangement, the gear shift tube is slotted lengthwise and an arcuate opening is provided in the outer sleeve of the steering column to expose the slotted side of the tube. That opening is provided with a sufficient arcuate extent that the slot in the gear shift tube remains exposed through the sleeve opening during rotation of the gear shift tube from one extreme position to the other, i.e. through movement of the gear shift lever from its PARK position to its LOW position.

The position switch is typically mounted to the steering column adjacent the sleeve opening with the switch actuator projecting through that opening into the slot in the gear shift tube. The switch actuator thus moves within the switch housing in response to rotation of the gear shift tube when the gear shift lever is moved from one position to another. When the switch is properly positioned on the steering column sleeve with respect to the slot in the gear shift tube, the actuator will move the movable switch contact into electrical engagement with the stationary contact or contacts in the switch housing only when the gear shift lever is in its REVERSE position so that electrical current is supplied by way of the position switch to the automobile back-up lights to turn on those lights.

In order to have the position switch operate properly to turn on the back-up lights only when the gear shift lever is in the REVERSE position, the position switch actuator and therefore the gear shift tube must be located angularly precisely with respect to the stationary outer sleeve carrying the switch housing and stationary switch contacts. As a practical matter, it is difficult to assemble the steering column gear shift tube and sleeve with a high degree of angular accuracy reliably on a production line. Actually, an angular error between those two members as high as 8° is quite common. Consequently, during production, if all the position switches are fastened to the same location on the steering columns, in a given instance, there may be as much as an 8° angular error in one direction or the other between the stationary switch contacts and the slot in the gear shift tube. Resultantly, the switch may be closed and the back-up lights turned on when the shift lever is in NEUTRAL, PARK or some intermediate setting, with obvious adverse consequences.

In an attempt to avoid this problem, some manufacturers have adopted assembly procedures whereby prior to installing the switch, the assembler moves the gear shift lever to a given position, e.g., its NEUTRAL position. Furthermore, the switch is made with a breakable connection between the actuator and the switch housing which retains the switch actuator in a reference position along its path which corresponds to the position of the gear shift lever that is selected during mounting of the switch, i.e., the NEUTRAL position. The assembler locates the switch housing opposite the arcuate opening in the outer sleeve of the steering column so that the switch actuator projects through the slot in the gear shift tube. Then he secures the housing to the steering column by screws or other comparable means. Next, the assembler moves the gear shift lever away from the NEUTRAL position causing the gear shift tube to move the switch actuator away from its reference position thereby breaking the mechanical connection between the actuator and the switch housing. Theoretically then, since both the gear shift tube and switch actuator were in correspondence initially, when the shift lever is moved into REVERSE, the movable switch contact will be moved into electrical engagement with the stationary switch contacts and the backup lights will be turned on.

In many cases, however, that ideal result does not materialize. This is because during installation of the position switch on the steering column, the switch is often handled roughly with the result that the connection holding the actuator in its reference position is broken prematurely and the actuator shifts from the reference position to some extent. Consequently, when the switch is secured to the steering column with its actuator projecting into the gear shift tube, while that tube may be in its NEUTRAL position, the switch housing (and stationary switch contacts) are no longer referenced to that position. Resultantly, when the shift lever is moved into REVERSE, the actuator is not moved to close the switch. Rather the switch closes at some other position of the shift lever.

Also, in some instances, the assembler in his haste may not properly position the gear shift lever in NEUTRAL prior to mounting the switch, but may locate it at some intermediate position adjacent the NEUTRAL position. Thus when the switch is secured to the steering column even with the switch actuator properly retained in its reference position, the switch housing and stationary contacts are again not referenced to the slot in the gear shift tube. Consequently, when the assembler moves the shift lever in order to break the mechanical connection retaining the switch actuator and shifts into REVERSE, the stationary contacts will not be aligned properly with the REVERSE position of the gear shift tube. Again, then, the switch will close and the brake lights will be turned on at some position of the shift lever other than the REVERSE position. Until now the only ways to alleviate the aforesaid problems known to applicant have been to remove and replace the switch with another properly mounted one or to loosen the original switch's mounting screws and reposition the switch relative to the neutral shift lever position, which positioning requires a special alignment tool. That procedure is obviously quite time consuming and costly, particularly if the problem is not discovered until final inspection of the vehicle.

Also some prior position switches of this general type have tended to be relatively complicated structures requiring a relatively large number of parts which have to be assembled using special tools thereby making the overall switch relatively expensive and installation procedure relatively involved.

SUMMARY OF THE INVENTION

Accordingly, it is an object of the present invention to provide an improved position switch.

Another object is to provide such a switch which self-references to the movements of the movable member which actuates the switch.

Yet another object of the invention is to provide such a switch which is particularly adapted to be mounted to an automobile steering column to turn on back-up lights only when the automobile gear shift lever is in its REVERSE position.

A further object of the invention is to provide a position switch of this type which can be mounted quickly and easily to an automobile steering column without any tools or other equipment.

Still another object of the invention is to provide a self-referencing position switch composed of a minimum number of inexpensive parts which are easily assembled.

Other objects will, in part, be obvious and will, in part, appear hereinafter.

The invention accordingly comprises the features of construction, combination of elements, and arrangement of parts which will be exemplified in the following detailed description, and the scope of the invention will be indicated in the claims.

Briefly, my switch is intended to monitor the position of a mechanical member; for example, a gear shift tube relative to a stationary member such as a steering column sleeve. It comprises first and second housing sections connected together. The first housing section is arranged to be mounted to the stationary member; the second such section defines a track for a movable switch member. The length of the track usually corresponds to the length of the movement path or sweep of the mechanical member relative to the stationary member.

One or more stationary switch contacts are spaced at selected positions along the switch track and a selected one or ones of these contacts are arranged to be engaged by a wiper carried by the movable switch member when that member is moved to a determined location along its track. The movable member also includes an actuator which projects from the switch housing and engages the external mechanical member whose position is to be monitored by the switch.

When the external mechanical member is at a selected location along its path or sweep, the movable switch member should be positioned along its track so that its wiper engages the stationary contacts in the switch housing so as to close the switch and energize an indicator which signals that the mechanical member is in that selected location. However, due to varying degrees of misalignment between the external mechanical member and the stationary member from one assembly to the next, when the switch is installed initially to the stationary member, such correlation between the positions of the mechanical member and the switch housing containing the stationary switch contacts may not exist. In accordance with this invention, however, provision is made for correlating or referencing the positions of the stationary switch contacts and the mechanical member after the switch is installed.

More particularly, the two switch housing sections are connected together so that the second section is movable relative to the first along a path which generally parallels that of the movable switch member. Also means are provided for removably retaining the second housing section at substantially any location along that path. If when the switch is installed, the positions of the stationary switch contacts and the external mechanical member are not correlated so that the switch is closed when the mechanical member is in its selected position, such correlation can be achieved simply by moving the mechanical member first to one end and then the other end of its track. This procedure causes the movable switch member to engage and shift the second housing section relative to the first section until the track of the movable switch member is in alignment with the path or sweep of the external member. After this is done, the positions of the stationary switch contacts are automatically referenced to or correlated with the position of the external member. In other words, if, when the mechanical member is in its selected position, the movable switch member is located to the left of the stationary switch contacts when it should bridge them, movement of the mechanical member toward the left end of its sweep or path will move the movable switch member to the left end of its track. Continued movement of the mechanical member to the left position will cause the movable switch member to shift the second housing section leftward by the amount required to enable the mechanical member to reach the end of its sweep. At this point, the left hand end of the switch track is referenced to or brought into correspondence with the left hand end of the mechanical member path. Likewise, the stationary switch contacts are referenced to the selected location of that member. Accordingly, when the mechanical member is moved to its selected location, the movable switch wiper will bridge the stationary contacts to close the switch and signal that the member is in that selected location.

Likewise, if due to such misalignment, the movable switch member is positioned to the right of the stationary contacts when the mechanical member is in its selected position, movement of the member to the right hand end of its path will cause the movable switch member to move the second housing section toward the right until the right end of the switch track is referenced to the right hand end of the mechanical member path. Again, this automatically correlates the positions of the stationary contacts and the mechanical member so that when that member is moved to its selected location, the switch will be closed.

This switch construction is particularly suitable for use on an automobile steering column to control the back-up lights. In this case, the switch housing conforms to the column sleeve and the first housing section is formed with clips which are arranged to resiliently engage in openings provided in the steering column sleeve adjacent the arcuate opening therein. The switch actuator projects through a slot formed on the concave side of the switch housing contiguous with the track therein. To install the switch, the automobile gear shift lever is desirably placed in the NEUTRAL position. Then the switch is positioned over the slot in the steering column sleeve so that the switch actuator projects through that opening into the slot in the gear shift tube. Finally, the switch housing is pressed against the sleeve until the clips thereon engage in the openings provided in the sleeve which engagement locks the switch to the sleeve.

Even though the positions of the stationary switch contacts and shift lever are not correlated at the outset, such correlation is brought about simply by moving that lever first to one end of its path, i.e. to the LOW position, and then to the other end of its path, i.e., the PARK position. If the switch was out of alignment when installed initially, such movements of the lever cause the switch to self-reference the switch track to the shift lever path so that when the lever is next moved to its REVERSE position, the switch is assuredly closed.

It should be mentioned that it is not even necessary to position the gear shift lever in its NEUTRAL position prior to installing the switch. If the switch is in, say, its DRIVE position, so long as the switch actuator is inserted into the slot in the gear shift tube, the arcuate manipulation of the switch housing required to enable the housing to clip into the openings provided in the steering column sleeve will automatically slide the movable switch member along its track as necessary to permit the switch to be clipped to the column. Then, when the shift lever is moved to its two extreme positions, the switch will self-reference as described above, the movable switch member shifting the movable housing section in one direction or the other relative to the stationary section as required to bring the stationary switch contacts into correlation with the REVERSE position of the gear shift lever so that the switch closes only when the lever is in that position.

As will be described presently, the switch itself is composed of a few separate parts which are relatively inexpensive to make in quantity and which are, for the most part, easily assembled by hand. Furthermore, the components are designed so that the switch as a whole can be installed very easily without any tools in a minimum of time by the average production workman. Accordingly, the switch should find wide application particularly in the automotive industry.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 5:
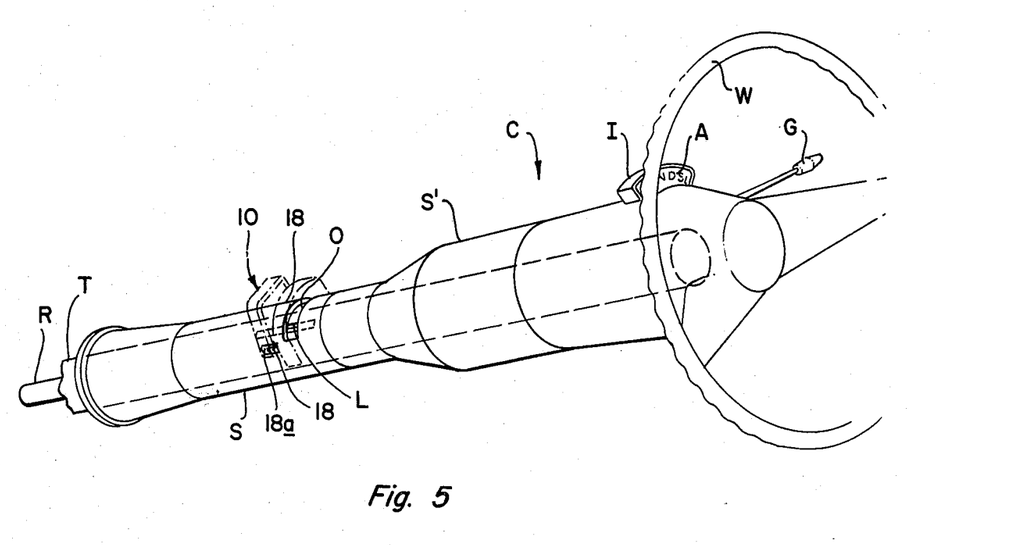
FIG. 5 is a perspective view on a much smaller scale showing the FIG. 1 switch installed on an automobile steering column.

Turn first to FIG. 5 which shows a steering column indicated generally at C of the type used on many present day automobiles. Column C includes a stationary sleeve S having an upper sleeve extension S' telescoped onto sleeve S. A steering wheel W is rotatively mounted at the upper end of the sleeve extension S' and that wheel is connected by a rod R extending along the axis of the sleeve and sleeve extension to the automobile steering mechanism (not shown). Also supported at the upper end of the steering column just below the wheel is a gear shift lever G. That lever extends through the wall of sleeve extension S' and is connected to a gear shift tube T extending coaxially between rod R and the sleeve and sleeve extension. The lower end of the tube T is connected to the automobile transmission (not shown). Manipulation of the gear shift lever G more or less up and down rotates the gear shift tube T about its axis, which, in turn actuates a control mechanism in the transmission to shift the transmission between its various gear settings. A typical automobile automatic transmission has six such settings, namely, PARK (P), REVERSE (R), NEUTRAL (N), DRIVE (D), SECOND (S) AND LOW (L). These various settings are indicated by an arrow A connected to the upper end of the gear shift tube on an indicator I mounted on the outside wall of the sleeve extension S' below the steering wheel W.

In many present day automobiles, provision is made for turning on back-up lights mounted at the rear of the automobile when the car is being operated in reverse to enable the driver to see where he is going. Conventionally, these lights are turned on by a position switch mounted on the steering column, which switch is closed when the gear shift lever G is moved to the REVERSE position. To accommodate this switch, an arcuate opening O is formed in sleeve S just below the sleeve extension S'. Normally the switch is secured to the sleeve adjacent opening O with the switch actuator extending through opening O and projecting into a lengthwise slot L formed in the gear shift tube T as seen in FIG. 5.

The present position switch indicated in dotted lines at 10 in FIG. 5 is also mounted at that same location so that no new techniques or procedures are required to incorporate my switch into present day steering columns. As in prior steering columns, the motion of the gear shift lever G between its various positions rotates the gear shift tube T which moves the slot L along the arcuate opening O. The switch actuator projecting into that slot thus follows the movements of the gear shift tube, moving the switch between its make and break positions. In this example, the switch 10 should close only when the gear shift lever G is in its REVERSE position to turn on the automobile back-up lights.

Figure 1:
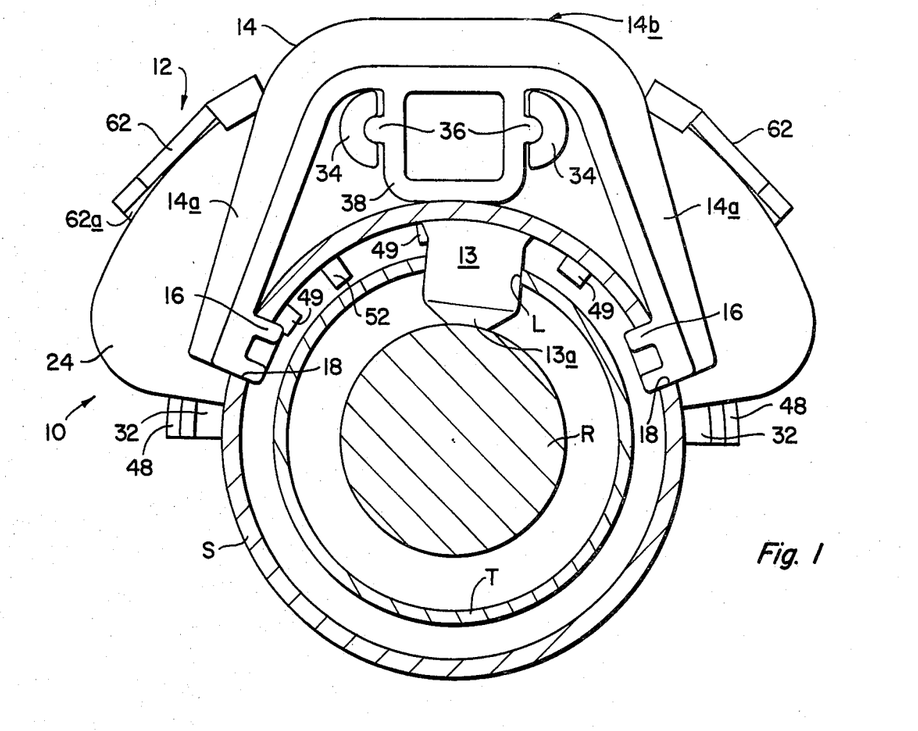
FIG. 1 is an elevational view with parts in section of a self-referencing position switch made in accordance with this invention and installed on an automobile steering column.
Figure 3:
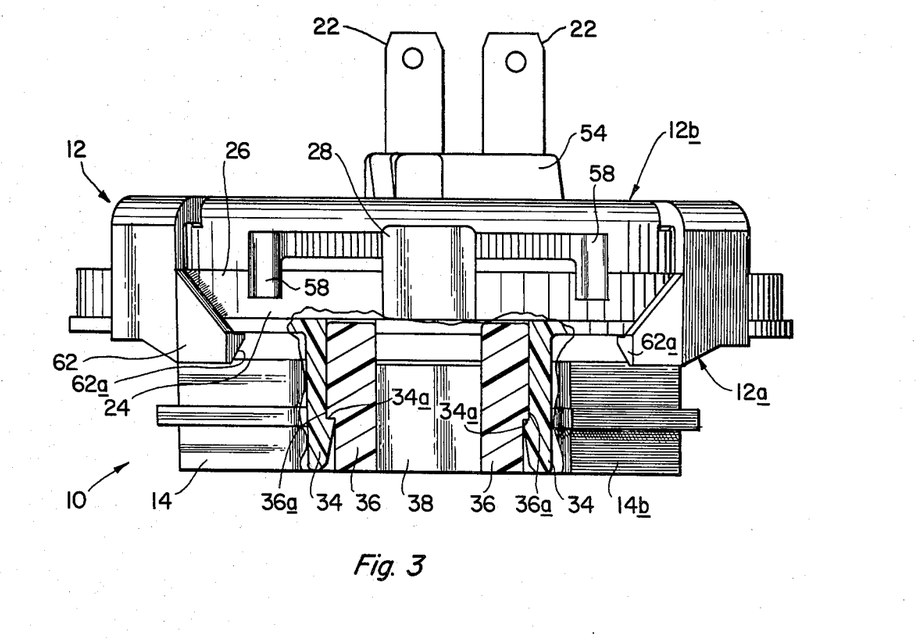
FIG. 3 is a top plan view with parts broken away showing certain internal components of the switch in greater detail.

Turning now to FIGS. 1 and 3, switch 10 includes a generally arcuate housing 12 molded on a suitable impact-resistant, electrically insulating plastic material. The switch actuator 13, to be described in more detail later, projects from the inside edge of housing 12. A clip 14 preferably molded on the same material as housing 12 is connected to the rear face of the housing. Clip 14 includes a pair of spaced-apart resilient legs 14a connected by a bridge 14b. Formed at the ends of those legs are a pair of teeth or lugs 16 which project toward one another. In use, the housing 12 is positioned over the arcuate opening O in sleeve S with the actuator 13 projecting through that opening into the slot L. The housing is retained there by clip 14 whose legs are sprung apart as the housing and clip are engaged around the sleeve. When properly seated, the lugs 16 snap into a pair of openings 18 formed in sleeve S just below the opening O therein as best seen in FIG. 1.

As mentioned at the outset, the steering column sleeve S and extension S' are telescoped together. This construction is used because the illustrated steering column C is collapsible in the event of an accident. To minimize the likelihood of the switch 10 inhibiting the telescoping action of the steering column, the edges 18a (FIG. 5) of the openings 18 remote from wheel W are beveled so that when the sleeve extension S' telescopes or collapses down on the sleeve S, the clip lugs 16 can slide up edges 18a out of openings 18.

A pair of electrically conductive male terminals 22 project from the face of housing 12 remote from the clip 14. These terminals are arranged to be connected in series with the automobile power supply and back-up lights. When the gear shift lever G is in its REVERSE position, the switch actuator 13 should be positioned by the gear shift tube T so that an electrical connection is made between terminals 22 thereby turning on the back-up lights. In all other positions of the gear shift lever G, there is no electrical connection between terminals 22 and the back-up lights remain off.

Figure 2:
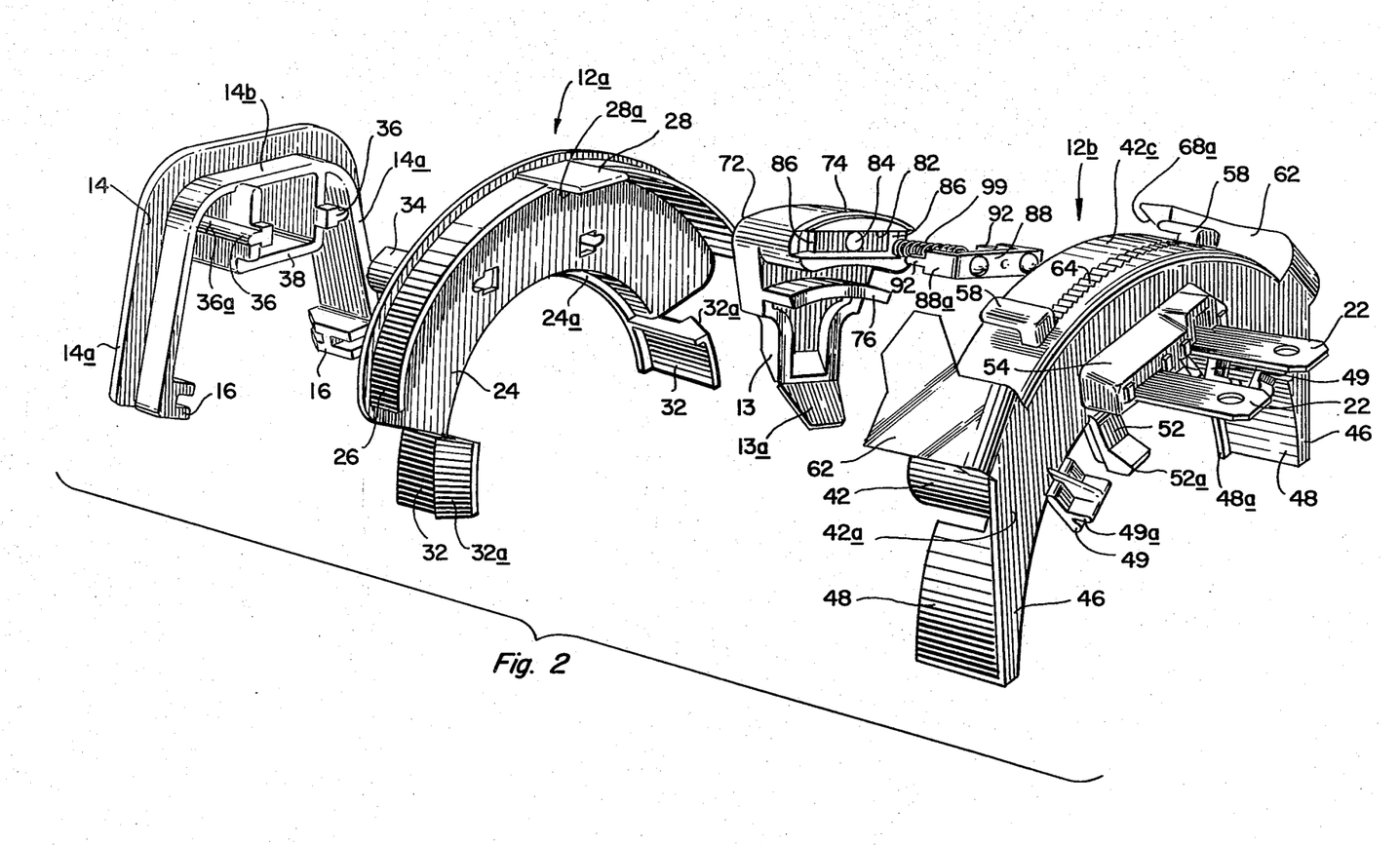
FIG. 2 is an exploded perspective view of the FIG. 1 switch.

Referring now to FIG. 2, the housing 12 comprises a first or stationary housing section indicated at 12a to which the clip 14 is connected and a second or movable housing section shown generally at 12b containing the electrical terminals 22. Housing section 12a has a generally flat arcuate body portion 24 formed with a lateral flange or skirt 26 at its radially outer edge which projects toward housing section 12b. Formed integrally with the top of skirt 26 is a laterally extending tab 28 having a serrated undersurface 28a. The tab 28 extends beyond the edge of skirt 26 toward housing section 12b and the serrations in surface 28a extend in that same direction. Formed at the radially inner edge of body portion 24 is a small, radially inwardly directed flange 24a whose inner diameter corresponds more or less to the outer diameter of the steering column sleeve S. Also formed integrally with portion 24 at the opposite ends thereof are a pair of laterally extending clips 32 which project toward housing section 12b with the noses 32a of those clips extending radially outward, or away, from one another. These clips 32 are used to couple the two housing sections together as will be described later.

As shown in FIGS. 1 to 3, projecting from the face of body portion 24 adjacent clip 14 are a pair of laterally spaced-apart channels 34, each channel having a generally C-shaped cross section, with the open sides of the channels facing one another. The channels 34 are arranged to snugly, slidably receive a pair of longitudinal ribs 36 extending out laterally from opposite sides of a box girder 38 depending from the clip bridge 14b. The clip 14 and housing section 12a are coupled together by sliding the ribs 36 into the ends of channels 34 until the clip and housing section 12a more or less contact one another as best seen in FIG. 3. Also, the channels 34 are formed with internal shoulders 34a spaced inward from the ends of the channels. On the other hand, the ribs 36 are provided with external beveled shoulders 36a spaced inward from the ends of the ribs. When the clip 14 is properly seated against the housing section 12a, the shoulders 36a and 38a interfit so that those two components do not come apart even during rough handling.

In the illustrated switch embodiment, the housing section 12a and clip 14 are made as separate parts which can be snapped together. It should be obvious, however, that a clip similar to clip 14 can be molded integrally with section 12a should that be found desirable to minimize the number of separate switch parts.

Figure 4:
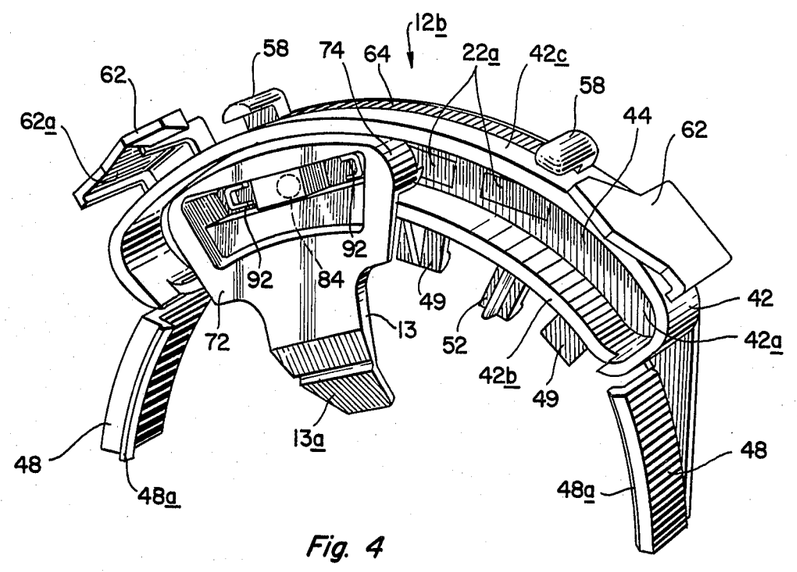
FIG. 4 is a perspective view of the movable housing section portion of the FIG. 1 switch showing other parts of the switch in greater detail.

Turning now to FIGS. 2 to 4, housing section 12b is also a generally arcuate molded plastic part. It includes an arcuate body portion 42 which defines by its front wall 42a and radially inner and outer side walls 42b and 42c respectively, a generally arcuate trough 44 which faces housing section 12a. Usually the angular extent of the trough is substantially the same as that of the sweep or path of slot L in tube T when the lever L is shifted between its PARK and LOW positions. Projecting from the ends of the body portion 42 at the side thereof remote from housing section 12a are a pair of wings 46 which taper more or less to a point. Formed integrally with those wings and extending toward section 12a are a pair of clips 48 whose noses 48a project toward one another. The clips 48 are arranged to slidably interlock with clips 32 on housing section 12a when the two sections are brought together as shown in FIG. 3 in order to secure those two sections together, while permitting their relative movement along a path generally parallel to the longitudinal axis of trough 44.

Projecting radially inwardly from the body portion wall 42b are three positioning members 49, the middle member projecting down from the middle of that wall and the other two members being spaced equal distances on opposite sides of the middle one. Each member 49 has an integral, laterally extending shelf 49a which functions as a guide. The radius of the arc defined by the three guides 49a is approximately equal to the radius of the sleeve S and the arcuate distance between the two outermost guides is appreciably less than the length of the arcuate opening O in the sleeve.

When the switch is positioned on the steering column as shown in FIGS. 1 and 5, the guides 49a engage the outer wall of sleeve S adjacent the upper edge of opening O therein. Located between the center positioning member 49 and the two outer such members are a pair of radially inwardly extending resilient clips 52. These clips have noses 52a extending generally in the same direction as guides 49a with the clips being located radially inward of the guides so that when the switch housing is mounted on the sleeve S, the clip noses 52a engage under the upper edge of opening O so as to clamp the switch housing 12b to that sleeve. Yet the clips permit the guides 49a and thus section 12b as a whole to slide along the upper edge of the opening O.

The terminals 22 extend through a boss 54 formed in housing portion 42 into the trough 44 (FIG. 4). The inner ends 22a of those terminals are bent more or less at right angles inside the trough and lie flush against the bottom wall 42a of the trough as best seen in FIG. 4. These two terminal ends 22a in trough 44 constitute a pair of stationary switch contacts that are electrically connected and disconnected as the switch 10 is closed and opened. Usually the contacts 22a are positioned at the same angular location along trough 44 as the REVERSE position of the lever L is along its sweep between its PARK and LOW settings.

Referring to FIGS. 2 and 4, projecting up from the wall 42c of housing body portion 42 intermediate the ends thereof are a pair of generally L-shaped retainers 58. The long legs of these retainers are spaced slightly above the wall 42c and extend toward the housing section 12a. When the two sections 12a and 12b are coupled together as shown in FIGS. 1 and 3, the skirt 26 on housing section 12a projects between retainers 58 and the body portion wall 42c. Also integrally formed with the housing body portion wall 42c are a pair of generally L-shaped clips 62 which project up near the end thereof of that wall. The long legs of the clips 62 are spaced somewhat above wall 42c and extend toward housing section 12a. Noses 62a are formed at the undersides of the two clips and when the two housing sections are brought together as shown in FIGS. 1 and 3, those noses 62a engage over the upper or radially outer edge of the body portion 24. Consequently, those clips 62 along with the interfitting clips 32 and 48a retain the two housing sections in their assembled condition yet permit section 12b to slide relative to section 12a parallel to the axis of trough 41. Preferably the spacing between retainers 58 should be such as to permit applicable relative movement between the two sections.

As best shown in FIGS. 2 and 4, an arcuate series of lengthwise serrations 64 are formed in the outer surface of the housing body portion wall 42c between the retainers 58 thereon. These serrations are arranged to interfit with the serrations 28a on tab 28 when the two housing sections are assembled. These engaging serrations serve as a ratchet in removably retaining the two housing sections in various positions of angular adjustment as will be described later.

Referring now to FIGS. 2 and 4, the switch 10 also includes a movable molded plastic switch member shown generally at 72. The switch member 72 includes a generally arcuate, laterally extending nose 74 whose height and width dimensions are slightly less than the width and depth dimensions of trough 44 in housing section 12b. Switch member 22 is normally positioned with its nose 74 extending into the trough 44 and is slidable along the length of the trough. A laterally extending arcuate guide 76 spaced just below nose 74 is arranged to engage under the wall 42b of housing body portion 42 to help the switch member 72 move smoothly along trough 44 and minimize the cocking of that member.

The switch actuator 13 is actually an integral depending part of the movable switch member 72 which extends substantially below the guide 76 as shown in FIG. 2. The actuator 13 terminates in a relative wide but thin flap extension 13a. This flap extension is relatively rigid side to side but quite flexible front to back. Its purpose is to facilitate entry of the actuator 13 into the slot L (FIG. 1) when mounting the switch as will be described in detail later.

Still referring to FIGS. 2 and 4, a slot 82 is formed in the switch member nose 74. Also a cylindrical hole 84 is located in the bottom wall of that slot near the center thereof, which hole extends only partway through the nose 74. Formed as well in slot 82 near the ends thereof are a pair of passages 86 which extend all the way through the nose 74. The slot 82 is arranged to receive a generally rectangular, electrically conductive wiper 88 having a pair of legs 88a extending at right angles to the wiper and arranged to slidably project through the passages 86 at the bottom of the slot. A coil spring 90 is arranged to seat in opening 84 and be compressed between the bottom of that opening and the wiper 88. The wiper legs 88a terminate in a pair of reduced width extensions 92 (FIG. 4) which project from the opposite ends of passages 86 and are turned over at right angles to retain the wiper in the slot. The lengths of the legs 88a are such that the wiper is biased out of the slot by the spring 90 so that the wiper can slidably engage the stationary contacts 22a in trough 44 in housing section 12b. The length of the wiper 88 is such that it bridges and thus electrically connects the two contacts 22a only when the switch member 72 is at a selected angular orientation in trough 44.

To assemble switch 10, the movable switch member 72, outfitted with the spring-biased wiper 88; is positioned in trough 44 in housing section 12b. Then the housing section 12a is seated against section 12b as illustrated in FIG. 3, thereby capturing the switch member 72 between the two sections. Those two sections are slidably locked together by the engagement of the clips 32 and 48 at the ends of the housing and clips 62 at the top thereof as discussed previously. When the two sections are locked together thusly, there is sufficient clearance between the edge of the body portion wall 42b of section 12b and the face of body portion 24 of the section 12a to provide a slot (not shown) to accommodate the arcuate movements of the actuator 13 along the lengthwise extent of trough 44. Finally, the clip 14 is attached to housing section 12a by sliding the ribs 36 into the channels 34 also as discussed previously.

It can be appreciated, then, that the subject switch is formed for the most part of a relatively few, simple, inexpensive molded plastic and stamped metal parts. Furthermore, with the exception of the installation of the switch contacts 22 which require bending, the components of the switch can all be assembled quite quickly and easily by hand without any tools. Consequently, the switch is relatively inexpensive to manufacture and assemble.

The switch 10 is installed on the steering column C shown in FIG. 5 by positioning the switch housing 12 opposite the opening O in sleeve S and inserting the switch actuator 13 through that opening into the slot L in the gear shift tube T. The flap 13a at the end of the actuator guides the actuator into slot L and since it is quite flexible from front to back, it simply bends out of the way upon engagement with the steering wheel rod R inside tube T (see FIG. 6A for example). Once the actuator 13 is inserted into slot L, the housing 12 is manipulated arcuately one way or the other until the lugs 16 on clip 14 are aligned with openings 18. Pressure on the clip against sleeve S spreads apart the clip legs 14a permitting the lugs 16 to snap into openings 18 in the sleeve S. At the same time, the clips 52 on housing section 12b snap under the upper edge of opening O, thereby slidably fastening the section 12b to the sleeve S.

It is important to note that while it might be desirable when installing the switch for the assembler to place the gear shift lever G in its NEUTRAL position to more or less center slot L in opening O and to manually move the switch actuator 13 to its intermediate position illustrated, for example, in FIG. 4, it is not necessary to do that. Actually the gear shift lever can be located in any of its operative positions, as can the movable switch member 72. All the assembler has to do is insert the actuator 13 into slot L and then swivel the switch housing 12 along the length of opening O until the clip 14 is aligned with openings 18 in the sleeve. As the housing is being aligned as aforesaid, the movable switch member 72, being fixed to the gear shift tube T by actuator 13, accommodates that movement by sliding along trough 44.

In a given instance, if the switch 10 should happen to be installed on the steering column C so that the trough 44 defining the track for the movable switch contact 72 is centered on or in alignment with the arcuate path of the gear shift tube slot L, then when the shift lever is moved to its LOW position, the switch member 72 will be positioned at the extreme left hand end of trough 44 as viewed in FIG. 4. In that same instance, when the lever is moved to its PARK position, the member 72 will be slid to the extreme right hand end of trough 44 as viewed in that same figure. With the switch so aligned, when the lever G is moved to its REVERSE position, the switch member 72 will be slid to an intermediate position wherein its wiper 88 bridges switch contacts 22a and thus closes the switch.

As a general rule, however, the trough 44 will not be so aligned so that the positions of the switch contacts 22a will not be aligned with the position of the gear shift tube slot L when the shift lever is in its REVERSE position. The switch 10 illustrated in FIG. 6A has been installed with its stationary components, namely clip 14 and housing section 12a indicated in dotted lines, centered on the opening O in sleeve S. The movable components of the switch, namely body portion 42 defining trough 44 and the slidable switch member 72 are shown in solid lines in their thus installed positions. The switch actuator 13 projects through the slot L in gear shift tube T which is positioned at some arbitrary setting by the gear shift lever. In this example, due to misalignment between the sleeve S and the gear shift tube or for some other reason, we will assume that the switch contacts 22a are displaced counterclockwise with respect to the REVERSE position of the shift lever. Consequently, if the gear shift tube T is moved from its position illustrated in FIG. 6A directly to its REVERSE position, the movable wiper 88 on member 72 will not bridge switch contacts 22a to close the switch so that the back-up lights will not be turned on at that REVERSE setting. Rather, they will be turned on at some other setting of the gear shift lever with undesirable consequences.

Figures 6A, 6B, 6C:
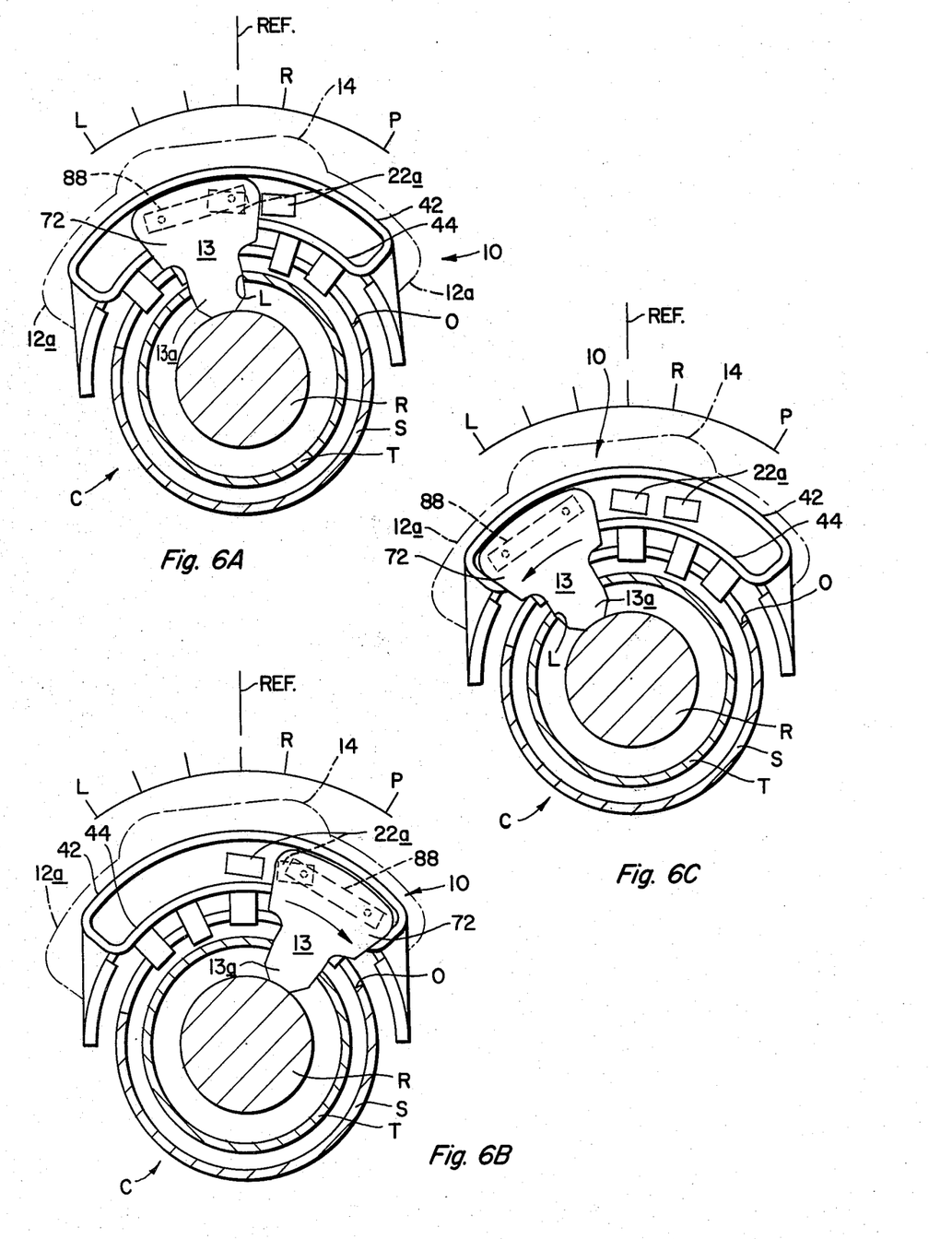
FIGS. 6A to 6C are diagrammatic views illustrating the operation of the FIG. 1 switch.

With the present switch, that situation is corrected easily simply by moving the gear shift lever toward its PARK position. Before the lever reaches that position, the switch member 72 will engage the right hand end of trough 44 (FIG. 6B) so that continued movement of the lever toward its PARK position will cause member 72 to slide the movable housing section 12b clockwise around sleeve S in the direction of the arrow as viewed in FIG. 6B approximately 6° so that the right hand end of the trough 44 will be in alignment with the PARK position of the shift lever L as shown in FIG. 6B. As noted previously, the length of sleeve opening O is great enough to permit this degree of sliding freedom of section 12b. The stationary switch contacts 22a are, of course, also moved approximately 6° clockwise as shown in FIG. 6B so that when the gear shift lever is positioned in REVERSE, the movable switch member 72 will be centered on contacts 22a and the wiper 88 will electrically connect them.

If there had been a clockwise misalignment of the gear shift tube T with respect to sleeve S, correction of the switch position is achieved in much the same manner by moving the gear shift lever in its opposite direction toward LOW. As soon as the movable switch member 72 engages the left end of trough 44, further movement of the lever to LOW will cause the housing section 12b to slide counterclockwise on sleeve S in the direction of the arrow in FIG. 6C by the amount of the error. Resultantly, when the lever is in LOW as shown in that figure, the left end of trough 44 will be correlated with the LOW position of the gear shift lever. Again, then, when the lever is moved to REVERSE, the switch member 72 will be centered over the switch contacts 22a and again those contacts will be electrically connected by wiper 88.

In actual practice, the assembler may not know if the switch is misaligned at all or the direction of any such misalignment. Accordingly, after he has mounted the switch 10 to the steering column, the proper assembly practice is for him to move the gear shift lever to its two extreme positions, PARK and LOW, so that whichever direction of the error (if any), the switch self-references to the sweep of the gear shift lever. However even if the assembler does not do that, the dealer or purchaser of the car will soon move the lever to its PARK and LOW positions so that the switch 10 will eventually automatically self-reference to the sweep of the gear shift lever.

Thus, normal actuation of the present switch self-references or self-adjusts the switch relative to a fixed mounting. This adjustment takes place only once unless some external force moves the movable switch section 12b out of adjustment.

The switch of this invention is not only useful as a position switch on an automobile steering column, it can also be used in almost any situation requiring a switch to be actuated by some external means which sweeps through a limited and repeating path where the make and break positions of the switch are in a predetermined relationship to each other. Further, while we have specifically illustrated a rotary type switch, a linear switch can also be made in accordance with this teaching. In the linear switch, the two housing sections are straight and slidably connected together for movement parallel to one another. As in the illustrated switch, a detent or ratchet arrangement is provided to removably position the housing section carrying the movable switch member relative to the stationary housing section. The movable switch member is moved between its make and break positions by an external mechanical member whose operative positions lie on a track which is generally parallel to the track of the movable switch member. A linear switch such as this could be used, for example, to turn on a buzzer to signal that the automobile emergency brake is still engaged after the car is started, the switch actuator in this case being moved by a suitable mechanical linkage with the emergency brake handle or cable.

Of course, if the subject switch is installed so that the installer knows that it is out of adjustment in a certain direction, the switch actuator need only be traversed in the direction toward which it is known that the switch need be adjusted or referenced. In such an arrangement, the switch housing track may be provided with more than the necessary length for the movement of the movable switch member. This is because when that member is moved back in the opposite direction, it is not required to touch and possibly move the movable housing section since it was pre-established that that housing section need be moved in only one direction.

By the same token, the switch track may be shorter than the sweep required for the actuator to traverse the extremes of its motion. In this case, the movable housing section will move and readjust with each full motion of the movable switch member through a complete cycle. This permits some overmotion of the movable switch member and eventual repositioning of the movable housing section. This arrangement would also suit a situation where a single switch would accommodate two or more functions, one having a different total motion of the movable switch member than the other. Also, of course, an electrical connection could be made to the wiper 88 in which case only one stationary contact 22a would be required to effect the switching action. Moreover, housing section 126 can carry several pairs of contacts 22a for correlation with several different positions of the external mechanical member. Further, the switch 10 can be arranged to open at the selected location of the mechanical member. With all of these advantages, then, my switch should find wide acceptance in the marketplace.

It will thus be see that the objects set forth above, among those made apparent from the preceding description, are efficiently attained, and, since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. A self-referencing position switch adapted to be responsive to the position of a movable member relative to a second member, the movable member being movable over a course between a location at one end of the course and a selected location along the course, said switch comprising
   A. a switch housing,
   B. a switch actuator projecting from the housing for engagement by one of said members and movable by that member relative to the housing along a track to selectively open or close the switch when positioned at a determined location along the track from one end thereof,
   C. means for mounting the housing to the other of said members so that the track extends in the same general direction as the course,
   D. means for movably connecting the housing to the mounting means so that the two can move relative to one another along a path which extends in the same general direction as said course, and
   E. means for adjustably maintaining the relative positions of the housing and mounting means along said path so that if the determined location is positioned beyond the selected location from said one course end, by moving said one member to said one course end, said switch actuator will be moved to said one track end and shift the housing relative to the mounting means by the amount required to align said determined track location with the selected course location.

2. The switch defined in claim 1 wherein said track is substantially straight.

3. The switch defined in claim 1 wherein said track is curved.

4. The switch defined in claim 1 wherein the lengths of the track and course are substantially equal so that if the determined track location and the selected course location are misaligned in either direction along the course, their positions can be correlated by moving the movable member to the opposite ends of said course.

5. The switch defined in claim 1 wherein the length of the track is greater than the length of the course.

6. The switch defined in claim 1 wherein the length of the track is less than the length of the course.

7. A self-referencing position switch comprising
   A. a first housing section,
   B. means in the first housing section defining a track,
   C. one or more electrical contacts positioned at selected locations along the track, said contacts having electrical connections leading out of the first housing section,
   D. a movable switch contact positioned in the first housing section for movement along the track, said movable switch contact including an actuator extending exteriorly of the housing for engagement by a movable member whose position is to be sensed by the switch,
   E. a second housing section,
   F. means facilitating mounting the second housing section to a support member with respect to which the position of the movable member is to be referenced,
   G. means for connecting the two housing sections together for movement relative to one another along a path which extends in the same general direction as the track, and
   H. means for adjustably retaining the two housing sections in various positions of adjustment along said path.

8. The switch defined in claim 7 wherein the track and path are substantially straight.

9. The switch defined in claim 7 wherein the track and path are curved.

10. The switch defined in claim 7 wherein the movable switch contact is slidably sandwiched between the two housing sections with said actuator projecting out between said sections.

11. The switch defined in claim 7 wherein the connecting means comprises clips formed on at least one housing section for engaging portions of the other section to removably lock the two sections together while permitting their said relative movement.

12. The switch defined in claim 7 wherein the retaining means comprises cooperating surfaces on the two housing sections which frictionally engage one another.

13. The switch defined in claim 12 wherein the cooperating surfaces are serrated so that the two housing sections can ratchet relative to one another.

14. The switch defined in claim 7 wherein the end of said actuator exteriorly of the housing is formed with an extension which is stiff in the direction of the track but flexible in the direction perpendicular to the track direction.

15. The switch defined in claim 7 wherein the facilitating means comprises a clip removably attached to the second housing section.

16. The switch defined in claim 15 and further including means on the first housing section for removably retaining the first housing section to the support member while permitting the first housing section to move relative to that member in the direction of said path.

17. The switch defined in claim 16 wherein the removable retaining means include resilient clips formed integrally with, and projecting out from, the first housing section.

18. The switch defined in claim 7 wherein the support member is a steering column sleeve having an arcuate opening therein and the movable member is a slotted gear shift tube positioned inside the sleeve with its slot exposed in the opening and the second housing section is mounted to the sleeve so that the first housing section is positioned opposite the opening and the actuator extends through the opening into the slot in the gear shift tube.

19. A self-referencing position switch responsive to the position of an external movable member relative to a stationary member comprising
   A. a first housing section,
   B. means defining a path in the first housing section, said path having at least one defined position,
   C. one or more stationary switch contacts mounted in the first housing section at selected locations along the path,
   D. a movable switch contact,
     (1) movable along the path so as to electrically engage the stationary contacts only at said selected locations, and
     (2) having an actuator for engaging by the external member,
   E. a second housing section,
   F. means for mounting the second housing section to the stationary member,
   G. means for connecting the two housing sections together so that they are movable relative to one another in more or less the same direction as said path, and
   H. means for adjustably retaining the housing sections relative to one another so that by moving the movable switch contact along said path beyond said defined path position to a selected position relative to the stationary support member, the movable housing section is moved so that the locations of the stationary contacts are referenced to the selected position.

* * * * *